United States Patent
Di Meco et al.

(10) Patent No.: US 6,656,073 B1
(45) Date of Patent: *Dec. 2, 2003

(54) TOOTHED BELT COMPRISING A TOOTH COVERING CLOTH TREATED WITH AN ADHESIVE COMPOSITION

(75) Inventors: Marco Di Meco, Pescara (IT); Arturo Carrano, Pescara (IT)

(73) Assignee: Dayco Europe S.r.l. (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/721,643

(22) Filed: Nov. 24, 2000

(30) Foreign Application Priority Data

Nov. 26, 1999 (IT) .......................... T099A1041

(51) Int. Cl.⁷ ............................................. F16G 1/04
(52) U.S. Cl. ......................................................... 474/267
(58) Field of Search ................................ 474/265, 266, 474/267, 268

(56) References Cited

U.S. PATENT DOCUMENTS

| | | | | |
|---|---|---|---|---|
| 4,604,081 A | * | 8/1986 | Mashimo et al. | 474/205 |
| 4,826,472 A | * | 5/1989 | Sato et al. | 474/202 |
| 5,178,586 A | * | 1/1993 | Mizuno et al. | 474/266 |
| 5,378,206 A | * | 1/1995 | Mizuno et al. | 474/205 |
| 5,417,618 A | * | 5/1995 | Osako et al. | 474/205 |
| 5,584,771 A | * | 12/1996 | Isshiki et al. | 474/264 |
| 5,609,541 A | * | 3/1997 | Tachibana et al. | 474/205 |
| 5,611,745 A | * | 3/1997 | Uto et al. | 474/205 |
| 5,861,212 A | * | 1/1999 | Mori et al. | 428/375 |
| RE36,870 E | * | 9/2000 | Isshiki et al. | 474/268 |
| 6,159,121 A | * | 12/2000 | Di Giacomo et al. | 474/205 |
| 6,220,983 B1 | * | 4/2001 | Osako et al. | 474/205 |
| 6,296,588 B1 | * | 10/2001 | Ciemniecki et al. | 474/268 |

* cited by examiner

Primary Examiner—Thomas R. Hannon
Assistant Examiner—Vicky A. Johnson
(74) Attorney, Agent, or Firm—Richard C. Woodbridge, Esq.; Stuart H. Nissim, Esq.; Thomas J. Onka, Esq.

(57) ABSTRACT

A toothed belt wherein the toothed portion is covered with a cover cloth consisting of a weft and a warp. The weft consists of weft yarns defined by an elastic core yarn and by at least one composite yarn wound about the elastic yarn; and each composite yarn comprises a high thermal and mechanical resistance yarn and at least one covering yarn wound about the high thermal and mechanical resistance yarn. To improve adhesion of the cloth to the elastomeric material of the belt body and teeth, to improve abrasion resistance and to extend the average working life of the belt, according to the present invention, the cloth is treated with an adhesive composition comprising resorcinol, formaldehyde, a highly saturated and carboxyl groups containing nitrile and conjugated diene copolymer latex, and epoxy resins.

10 Claims, 1 Drawing Sheet

TOOTHED BELT COMPRISING A TOOTH COVERING CLOTH TREATED WITH AN ADHESIVE COMPOSITION

FIELD OF THE INVENTION

The present invention relates to a treating method for bonding a cover cloth to an elastomeric material forming the body of a toothed drive belt.

BACKGROUND OF THE INVENTION

Number 1 in FIG. 1 indicates as a whole a known toothed belt comprising a body 2 of elastomeric material in which are embedded a number of threadlike longitudinal reinforcing inserts 3.

Body 2 comprises teeth 4, which are covered with a cloth 5 comprising weft yarns 6 extending lengthwise of belt 1, and warp yarns 7 extending crosswise of belt With reference to FIG. 2, each weft yarn 6 consists of an elastic core yarn 8 and at least one composite yarn 9 wound about the elastic yarn and in turn comprising a high thermal and mechanical resistance yarn 10 about which is wound at least one covering yarn 11.

The elastic yarn 8 is preferably made of polyurethane.

Yarn 10 must ensure high mechanical and thermal resistance of cloth 5 as a whole, and therefore preferably consists of paraaromatic polyamide. Moreover, having a lower abrasion resistance than covering yarn 11, yarn 10 must be isolated from the outer surface to prevent damage by the severe friction on the pulley teeth, that could result in failure of teeth 4. For this reason, covering yarn/s 11 must be of greater volume than high thermal and mechanical resistance yarn 10 so as to cover it completely, and is/are therefore preferably made of texturized polymer material, more preferably aliphatic polyamide, and even more preferably nylon 66 fibers. Alternatively, covering yarn 11 may have an hybrid composition, preferably comprising nylon and teflon, and may be single or multiple, preferably two yarns, one wound clockwise and the other anticlockwise about high thermal and mechanical resistance yarn 10.

Table 1 shows an example composition of the various weft yarns 6.

TABLE 1

| Weft 6 composition | Units of measure | Value |
| --- | --- | --- |
| ELASTIC CORE YARN 8 | | |
| Type of material | | Polyurethane (Dorlastan - Bayer registered trademark) |
| Count | Dtex | 480 |
| N° yarns | N/2.54 cm | 55 |
| HIGH RESISTANCE YARN 10 | | |
| Type of material | | Para-aromatic polyamide (Twaron 1008 - Akzo Nobel registered trademark) |
| Count | Dtex | 220 |
| Coverage | Turns/m | 900 |
| COVERING YARN 11 | | |
| Type of material | | Texturized Nylon 66 HT |
| Count | Dtex | 110 |
| Coverage | Turns/m | 1300 |

Warp 7 of cover cloth 5 differs from weft 6 described above. Its yarns are not necessarily elastic, and therefore preferably consist of polyamide, more preferably nylon 66.

| Warp 7 composition | Unit of measure | Value |
| --- | --- | --- |
| Type of material | | Nylon 66 |
| Count | Dtex | 330 |
| Yarns | N/2.54 cm | 80 |

An important stage in the manufacture of toothed belts is bonding the fibers of the cloth to the elastomer constituting the body and teeth of the belt. This is done using various methods, the commonest of which is to treat the cloth with a latex solution of resorcinol, formaldehyde and rubber, commonly known as RFL. The treatment consists in impregnating the fibers by immersion in a bath comprising an aqueous RFL solution.

When treated with RFL, cloth 5 described above poses problems as regards adhesion to the elastomer of the teeth, and has a low abrasion resistance.

High thermal and mechanical resistance yarns, such as aromatic polyamides, are not directly treated with RFL, but are normally preactivated, e.g. pretreated with isocyanates, polyurethanes, aliphatic epoxy resins or plasma.

Due to the complex structure of the cloth described, RFL treatment mainly acts on the covering yarns and not on the underlying high resistance yarns. In the cloth described, however, the covering yarns 11 often cover only part of the high thermal and mechanical resistance yarns 10.

RFL treatment also reduces the tensile strength of cloth consisting of aliphatic polyamide fibers, whereas the advantage of using such yarns is to increase tensile strength.

SUMMARY OF THE INVENTION

It is an object of the present invention to provide a method of treating a toothed belt cover cloth, designed to eliminate the aforementioned drawbacks, and which, in particular, does not reduce the overall tensile strength of the cover cloth, and provides for bonding the cloth with no pretreatment required.

According to the present invention, there is provided a toothed belt, wherein the toothed portion is covered with a cover cloth consisting of a weft and a warp; said weft consisting of weft yarns defined by an elastic core yarn and by at least one composite yarn wound about said elastic yarn; said composite yarn comprising a high thermal and mechanical resistance yarn, and at least one covering yarn wound about the high thermal and mechanical resistance yarn; said cover cloth covering the teeth having been treated with an adhesive composition; characterized in that said adhesive composition comprises:

a highly saturated and carboxyl groups containing nitrile and conjugated diene copolymer latex;

a resorcinol and formaldehyde resin;

aromatic epoxy resins.

According to the present invention, there is also provided a method of treating a toothed belt cover cloth, characterized by comprising the step of treating said cloth with an adhesive composition comprising:

a highly saturated and carboxyl groups containing nitrile and conjugated diene copolymer latex;

a resorcinol and formaldehyde resin;

aromatic epoxy resins.

DETAILED DESCRIPTION OF THE INVENTION

Figure 1:
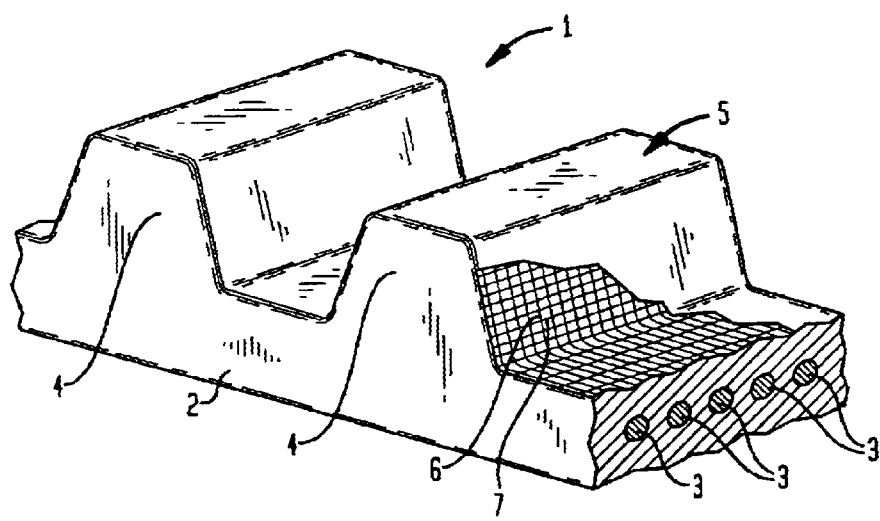
FIG. 1 is a partial perspective view of a prior art, toothed transmission belt.
Figure 2:
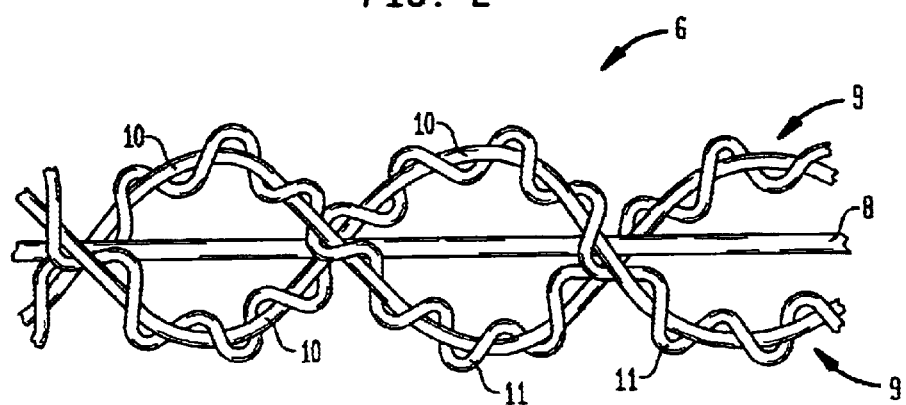
FIG. 2 shows schematically a composite thread forming the weft of the fabric covering the rubber body of the toothed belt shown in FIG. 1.

The following is a detailed description of a toothed belt comprising a cloth treated with an adhesive composition in accordance with the invention, and of the method of producing the adhesive composition.

The composition is obtained by forming in a vessel a resorcinol and formaldehyde solution (hereinafter referred to as RF solution) wherein the resorcinol to formaldehyde molar ratio preferably ranges from 1:3 to 3:1, and more preferably from 2:1 to 1:2.

Alternatively, precondensed resorcinol and formaldehyde resins may be used, and formaldehyde added to achieve the desired molar ratio.

A basic solution, preferably consisting of an aqueous 10% by weight sodium hydroxide solution, is then added to obtain a basic pH.

This is left to rest at ambient temperature, before adding a solution of a highly saturated and carboxyl groups containing nitrile and conjugated diene copolymer latex, preferably hydrogenated, carboxylated acrylonitrile butadiene latex. Even more preferably, the latex consists of an aqueous 40% by weight solution of hydrogenated, carboxylated acrylonitrile/butadiene, such as that marketed by the name ZETPOL ZLX B (Nippon Zeon Co., Ltd trademark).

The RF solution to added latex weight ratio preferably ranges from 1:5 to 1:20.

According to the present invention, aromatic epoxy resins, preferably in dispersion, are also added to the above solution. The added latex to aromatic epoxy resin weight ratio preferably ranges from 2:1 to 30:1.

Commonly used epoxy resins include, for example, EPI-RFZ 5003-W-55 produced by Shell Chemicals Co., an aromatic epoxy resin such as Novolak, or Aquatohto 5003 produced by Pecten Chemicals.

The adhesive composition therefore preferably comprises:

100 parts by weight of a highly saturated carboxyl groups containing nitrile and conjugated diene copolymer latex;

5 to 30 parts by weight of resorcinol and formaldehyde resin; and 2 to 10 parts by weight of aromatic epoxy resins.

The resulting solution is left to rest, after which a filler, such as varying quantities of carbon black, is added.

The cloth fibers are then immersed in the solution of the composition according to the invention, are dried at temperatures ranging from 120° C. to 140° C. for 60–90 seconds, and are fixed thermally at temperatures of about 200° C. to 205° C. for 60–90 seconds.

The composition according to the invention is advantageously used to bond fibers of a cloth structured as described previously to a hydrogenated acrylonitrile/butadiene elastomer. Following immersion, cloth 5 is therefore placed on the elastomeric material; and the method of fabricating the toothed belt also comprises a curing step.

The advantages of the composition according to the present invention will be clear from the foregoing description.

A cloth 5, comprising weft yarns defined by an elastic core yarn 8 and by at least one composite yarn 9 wound about elastic yarn 8 and in turn comprising a high thermal and mechanical resistance yarn 10 and at least one covering yarn 11, can be so treated as to improve adhesion of the cloth fibers to an elastomeric material without overly reducing the tensile strength of the cloth itself.

In particular, when applied to cloth 5, the composition according to the invention surprisingly increases the abrasion resistance of the cloth as a whole, thus extending the average life of the belt.

Clearly, changes may be made to the composition as described herein without, however, departing from the scope of the present invention. For example, the weight ratios of the various adhesive composition components may vary.

The invention will now be described further by way of a number of purely non-limiting examples.

EXAMPLE 1

Tables 3–5 show solution compositions by which to obtain a composition in accordance with the invention.

All the values in the following Tables refer to 100 parts of latex.

TABLE 3

| RF solution composition | | |
|---|---|---|
| RF solution | Dry | In solution |
| Resorcinol | 7.1 | 7.1 |
| Formaldehyde | 2.9 | 7.8 |
| Sodium hydroxide | 0.2 | 2.0 |
| Water | — | 128.8 |
| Total | 10.2 | 145.7 |

The formaldehyde is added as an aqueous solution 37% by weight, and the sodium hydroxide as an aqueous solution 10% by weight.

The resulting solution is left to rest for 6 hours at 25° C., after which, latex and epoxy resins are added as shown in Table 4.

TABLE 4

| Composition of RFL and epoxy resin solution | | |
|---|---|---|
| RFL solution | Dry | In solution |
| Latex | 100.0 | 250.0 |
| Epoxy resin | 5.0 | 50.0 |
| Water | — | 130.3 |
| Total | 115.2 | 576.0 |

The latex used is carboxylated HNBR 40% by weight (hydrogenated acrylonitrile/butadiene elastomer) produced by Nippon Zeon Co., Ltd and marketed as ZLX B. The epoxy resins are EPI-REZ-5003-W-55 produced by Shell Chemicals Co., and are added as a 10% by weight dispersion.

Carbon black is added to the above solution, as shown in Table 5, and the resulting composition is ready for cloth treating.

TABLE 5

Solution containing the adhesive composition

| Bath solution | Dry | In solution |
|---|---|---|
| RFL and epoxy resin solution | 115.2 | 576.0 |
| Carbon black | 10.0 | 40.0 |
| Total | 152.2 | 616.0 |

EXAMPLE 2

Table 6 shows a comparison of the physical and mechanical properties of the adhesive composition according to the invention (composition 1 in Table 6) and adhesive compositions with no epoxy resins (composition 2 and 3).

TABLE 6

Comparison of physical and mechanical properties

| Composition | 1 | 2 | 3 |
|---|---|---|---|
| Formaldehyde/resorcinol molar ratio | 1.5 | 1.0 | 1.5 |
| Latex (ZLX-B) (Nippon Zeon) | 100 | 100 | 100 |
| RF resin | 10 | 15 | 15 |
| Epoxy resin | 5 | 0 | 0 |
| Tensile strength, Mpa | 22.0 | 27.0 | 25.0 |
| Elongation | 320% | 580% | 540% |
| 50% modulus, Mpa | 6.0 | 6.5 | 8.3 |
| Shore-A hardness | 87 | 87 | 92 |
| Heat resistance (72 hours at 140° C.): Elongation, % | 160 | 240 | 220 |
| Water resistance (72 hours at 50° C.): weight change | 30.2 | 32.6 | 62.1 |
| Oil resistance (72 hours at 120° C.): weight change | 23.9 | 23.9 | 25.3 |

Table 7 shows the results of treating the same cloth with the above three compositions. All the cloth specimens were cured for 30 minutes at 160° C. together with a formulation containing acrylonitrile/butadiene.

TABLE 7

Treated cloth tests

| Composition | 1 | 2 | 3 |
|---|---|---|---|
| Quantity of adhesive as cloth weight % | 18.3 | 15.6 | 16.9 |
| Adhesion (N/25 m) | 185 | 180 | 180 |
| Abrasion test | 4+ | 3 | 3+ |

The abrasion of the cloth was tested using the conditions of ASTM D 3884-92 method and under the conditions shown in Table 7, but differently from the ASTM method, metal pulleys are employed and temperature is measured using an infrared lamp.

TABLE 8

Abrasion test conditions

| Equipment | Taber abrasion tester |
|---|---|
| Disk diameter | 150 mm |
| Revolutions | 70 rpm |
| Number of arms | 2 |
| Load | 1 kgf |

TABLE 8-continued

Abrasion test conditions

| Equipment | Taber abrasion tester |
|---|---|
| Abrasion wheel | Toothed wheel (140 rpm), 43 mm diameter, 24 mm width, 22 teeth, 5 mm high, 7 mm pitch |
| Infrared lamp | 500 watt |
| Specimen size | 15 mm × 15 mm |
| Surface temperature | 120° C. |
| Total number of revolutions | 10000 |

Abrasion was assessed visually under a microscope, and RFL treatment loss judged as shown in Table 9.

TABLE 9

| Visual abrasion assessment | |
|---|---|
| 5 | 0% RFL loss |
| 4 | 25% RFL loss |
| 3 | 50% RFL loss |
| 2 | 75% RFL loss |
| 1 | 90% RFL loss |

We claim:

1. A toothed belt, wherein the toothed portion is covered with a cover cloth (5) comprising a weft (6) and a warp (7); said weft (6) consisting of weft yarns, said weft yarns comprising an elastic core yarn (8) and two composite yarns (9) wound about said elastic yarn (8); each said composite yarn (9) comprising a high thermal and mechanical resistance yarn (10), and at least one covering yarn (11) wound about the high thermal and mechanical resistance yarn (10); said cover cloth (5) having been treated with an adhesive composition; characterized in that said adhesive composition comprises resorcinol, formaldehyde, a highly saturated, carboxyl groups containing nitrile and conjugated diene copolymer latex, and aromatic epoxy resins.

2. A toothed belt as claimed in claim 1, characterized in that said conjugated diene is butadiene, and said nitrile is acrylonitrile.

3. A toothed belt as claimed in claim 1, characterized in that the weight ratio of said latex and said epoxy resins ranges from 2:1 to 30:1.

4. A toothed belt as claimed in claim 1, characterized in that said elastic yarn (8) is made of polyurethane.

5. A toothed belt as claimed in claim 1, characterized in that said high thermal and mechanical resistance yarn (10) is made of paraaromatic polyamide.

6. A toothed belt as claimed in claim 1, characterized in that said covering yarn (11) is a yarn of texturized polymer material.

7. A toothed belt as claimed in claim 6, characterized in that said covering yarn (11) is made of polyamide.

8. A toothed belt as claimed in claim 7, characterized in that said covering yarn (11) is made of nylon 66.

9. A toothed belt as claimed in claim 1, characterized in that said warp (7) is made of nylon.

10. A toothed belt, wherein the toothed portion is covered with a cover cloth (5) comprising a weft (6) and a warp (7); said weft (6) comprising:
   an elastic core yarn (8);
   a high thermal and mechanical resistance yarn (10); and,
   at least one covering yarn (11) twisted around said high thermal and mechanical resistance yarn (10) to form a composite yarn (9), wherein said composite yarn (9) is in turn twisted around said elastic core yarn (8) to form a weft yarn and further wherein said cover cloth (5) having been treated with an adhesive composition, said adhesive composition comprising resorcinol, formaldehyde, a highly saturated, carboxyl groups containing nitrile and conjugated diene copolymer latex, and aromatic epoxy resins.

* * * * *